United States Patent
Hills

(10) Patent No.: US 10,623,362 B1
(45) Date of Patent: Apr. 14, 2020

(54) MESSAGE GROUPING TECHNIQUES

(71) Applicant: Amazon Technologies, Inc., Seattle, WA (US)

(72) Inventor: Loren Stephen Hills, Marysville, WA (US)

(73) Assignee: Amazon Technologies, Inc., Seattle, WA (US)

( * ) Notice: Subject to any disclaimer, the term of this patent is extended or adjusted under 35 U.S.C. 154(b) by 407 days.

(21) Appl. No.: 15/428,096

(22) Filed: Feb. 8, 2017

Related U.S. Application Data

(63) Continuation of application No. 14/056,848, filed on Oct. 17, 2013, now Pat. No. 9,596,196.

(51) Int. Cl.
*G06F 3/048* (2013.01)
*H04L 12/58* (2006.01)

(52) U.S. Cl.
CPC .............. *H04L 51/22* (2013.01); *H04L 51/16* (2013.01); *H04L 51/36* (2013.01)

(58) Field of Classification Search
CPC . G06F 3/0481; H04L 12/581; H04L 12/1813; G06Q 10/107; G06Q 10/10
See application file for complete search history.

(56) References Cited

U.S. PATENT DOCUMENTS

| | | | | |
|---|---|---|---|---|
| 8,862,669 | B2 * | 10/2014 | Jeong ................... | G06Q 10/107 709/202 |
| 2011/0225249 | A1 * | 9/2011 | Forstall .................. | H04L 51/00 709/206 |
| 2012/0158728 | A1 * | 6/2012 | Kumar .................. | G06F 16/954 707/737 |
| 2012/0185797 | A1 * | 7/2012 | Thorsen ................. | G06Q 10/00 715/784 |
| 2013/0204946 | A1 * | 8/2013 | Forstall ................ | G06Q 10/107 709/206 |
| 2015/0033297 | A1 * | 1/2015 | Sanso ................... | H04L 63/104 726/5 |

* cited by examiner

*Primary Examiner* — Rashawn N Tillery
(74) *Attorney, Agent, or Firm* — Thorpe North & Western, LLP.

(57) ABSTRACT

Technology for message grouping is provided. In one example, a method may include identifying message addresses to group together. Messages from the message addresses may be modified to include a common sender group attribute according to a defined address grouping rule. The messages exchanged with the message senders may be arranged as a grouped conversation using the common sender group attribute.

20 Claims, 10 Drawing Sheets

| Text Message from Social Network 2425-252 |
|---|
| Email Message from Social Network 2425-135 |
| Instant Message from Social Network 2425-2 |
| Voice Message from Social Network 2425-9271 |
| Message from Loren |

*FIG. 1B*

| Messages from Social Network |
|---|
| Message from Loren |
| Message from Scott |
| Message from Steve |
| Message from Peter |

*FIG. 1C*

Grouping Tool                    Your Account | Help
                  510

Search  Rules [V]   Enter Search Keywords...   (Go)

Rule Name    515    Enter Rule Name Here...

Rule Variables      Enter variables to identify senders
             520    from which to group messages.

Apply to
Existing     525   ☐ Yes            ☐ No
Messages?

Submit

*FIG. 5*

MESSAGE GROUPING TECHNIQUES

CROSS-REFERENCE TO RELATED APPLICATIONS

This is a continuation of U.S. patent application Ser. No. 14/056,848 filed Oct. 17, 2013, which is incorporated herein in its entirety.

BACKGROUND

With an ever-increasing number of available personal computing devices, as well as technologies for using those computing devices to communicate with one another, users receive a growing volume of electronic communications or messages to process and manage. For example, the electronic communications may include email, text messages, multimedia messages, social network messages, visual voicemail and so forth from a large number of sending individuals or entities.

Management of electronic messages received by users may increase in complexity with an increase in the volume of messages. Computer network-based email systems, as an example, often provide features for users to sort messages delivered to an email inbox or to organize messages into defined folders. However, email routing and organization may become problematic for a user, such as when customized, user-defined rules and other email filters overlap. A user may become frustrated when filters, rules, and other message routing decisions cause messages to be delivered to folders that are not expected or cause messages to be processed in a manner other than intended. Additionally, while many messages may be filtered or otherwise organized, the folders into which the messages are organized may still be cluttered and difficult to manage, sort through, or easily discover or view desired messages.

BRIEF DESCRIPTION OF THE DRAWINGS

FIG. 1B illustrates an example recipient inbox with ungrouped senders.

FIG. 1C illustrates a recipient inbox with grouped senders in accordance with an example of the present technology.

FIG. 5 is a block diagram of a grouping tool for grouping messages from a plurality of senders in accordance with an example of the present technology.

DETAILED DESCRIPTION

Figure 1A:
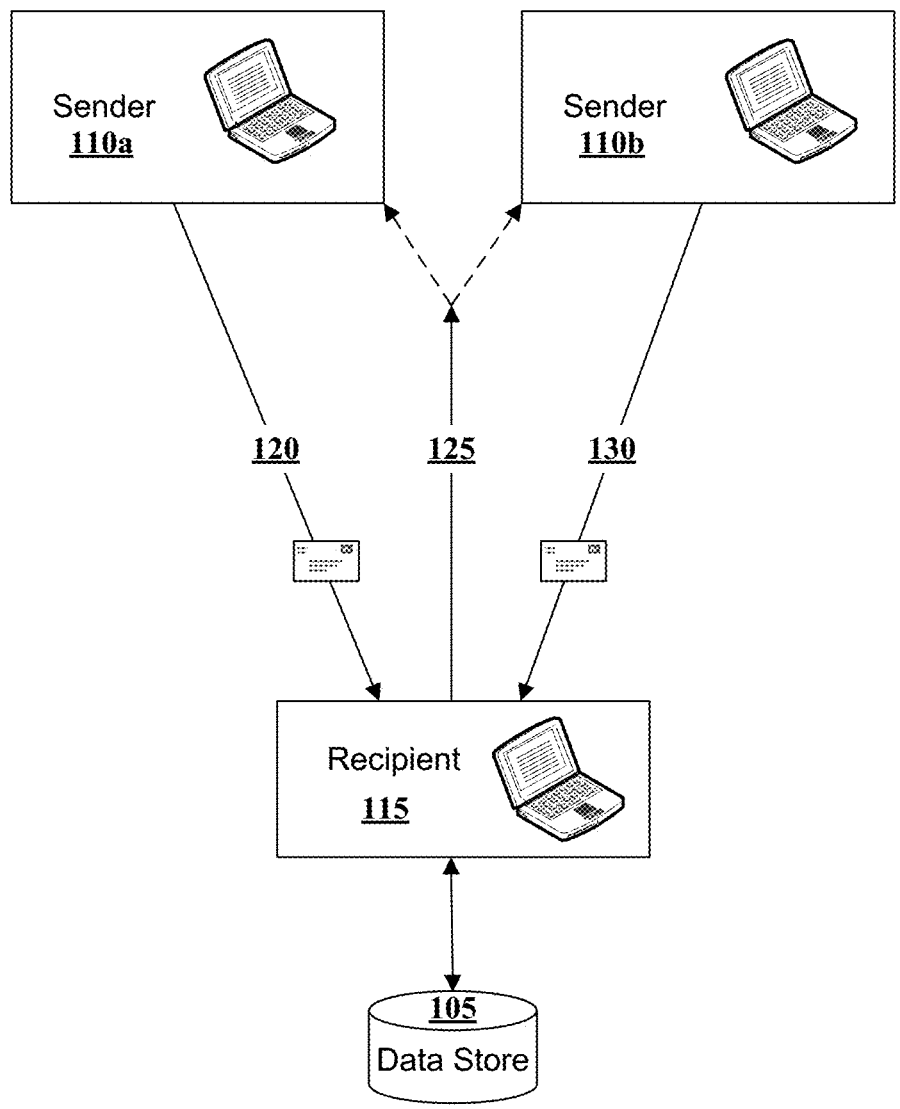
FIG. 1A is a schematic overview of a system for grouping messages from a plurality of senders in accordance with an example of the present technology.

Technology is described for grouping of electronic messages. The messages may be formatted in any of a variety of electronic message types or formats. In an example implementation of the technology, a method may include identifying message addresses to group together. The message addresses may correspond to one or more entities (e.g., people, corporations, electronic services, servers or other computing devices, etc.) from which the messages originated or from which the messages were sent. Messages received from the message addresses may be modified to include a common sender group attribute according to a defined address grouping rule. For example, the address grouping rule may be a user-defined address grouping rule that may specify a characteristic by which the message addresses are identified for modification to include the sender group attribute. The messages exchanged with the message senders may be arranged as a grouped conversation using the common sender group attribute. For example, the messages with the common sender group attribute may be displayed as if the messages are from an individual sender and/or may be organized for display together.

In a further implementation, the method may include receiving user input identifying the message senders or addresses to group together. The user input may define an address grouping rule for identifying or modifying the messages. For example, the address grouping rule may specify a portion of an address of the message addresses that is common to each of the message addresses to be grouped together. Modifying the messages may include modifying the messages from the grouped message addresses to include a common sender group attribute in a message header. The method may further include modifying messages from/to the message addresses to include the common group header. The messages exchanged with the message addresses may be combined or arranged as a grouped conversation. For example, messages grouped together may appear together as a though the messages were originally received from a single entity to form a single text message conversation. As another example, messages grouped together may appear as a single email conversation occupying a single line item in an email inbox even though the messages may have disparate subject lines or disparate message body subjects.

In another example, a computer system may be used to implement the present technology and may include, for example, a message receipt module to receive messages from message addresses. An address grouping rule definition module may receive an address grouping rule definition for processing the message addresses. The address grouping rule may be user-defined, such as by an end-user, an administrator and so forth. Alternatively, the address grouping rule may be a machine-defined address grouping rule, such as an address grouping rule defined through machine learning, text analysis or the like. A rule data store may store the address grouping rule. A grouping module may modify the messages to include a common group attribute based in part on the address grouping rule. As a result of the messages including the common group attribute, the messages may be arranged to appear as grouped messages in services, applications, clients, or other systems supporting this email grouping feature.

Referring to FIG. 1A, a system for grouping messages from a plurality of senders 110a, 110b or addresses is illustrated in accordance with an example of the present technology. In this example, senders 110a, 110b each send messages 120, 130 to a recipient 115. This example represents an implementation of the technology operable between a sender 110a, 110b and a recipient 115 without intervention from a domain system, email service, other service, device or entity for which examples will be described in further detail later.

Messages 120, 130 from senders 110a, 110b may be associated with sender addresses, which may also be referred to herein as "message addresses". The sender addresses may represent email addresses, telephone numbers, device addresses, instant messaging addresses, device or user identifiers and so forth. When a sender 110a, 110b sends a message to the recipient 115, the message received from the sender 110a and/or 110b may include the sender address. The recipient 115 may receive messages from any number of senders 110a, 110b. As has been described, managing a large number of messages may be a challenge for a recipient 115. In some instances, the recipient 115 may identify two or more senders 110a, 110b as related to one another. For example, the senders 110a, 110b may represent a single entity (e.g., a cell phone service provider (ISP) sending messages from multiple addresses, the senders 110a, 110b may be unrelated but may be sending messages of a related nature, or the senders may have a relationship that is known to the recipient 115 but which may not be readily identifiable based on the sender addresses or other characteristics of the messages. As a result, a message inbox of the recipient 115 may become unnecessarily cluttered. Sorting through messages and finding a desired message may become difficult.

The present technology enables a user to group messages according to sender address by modifying the message. As a result, clutter may be reduced and the message inbox may be simpler to navigate, sort, etc. Specifically, the recipient 115 may define a address grouping rule and store the address grouping rule in a data store 105. The address grouping rule may identify multiple message addresses to group together. When a message from one or more of the multiple message addresses is delivered to the recipient 115, the message may be modified based on an applicable address grouping rule to enable grouping with other messages also matching the address grouping rule. The recipient 115 may define and store any number of different rules which may be used to manage incoming messages. In the event of a conflict between multiple rules, a later created/modified of the address grouping rules may supersede the other of the address grouping rules.

The address grouping rule(s) may be used to modify a message header. The message header may be modified to include a sender group attribute. The sender group attribute may be the same for each of the messages to be included in a single group. Modification of the header may result in messages from the plurality of senders being grouped and displayed together similarly as if the messages were part of one conversation, even though the messages may relate to different subjects or conversations and may optionally be unrelated to one another. For example, messages 120, 130 received from senders 110a, 110b may be arranged for display together on a display screen, and when the "conversation" is collapsed in a graphical user interface view, the messages may appear to be from a single sender. The address grouping rule may include a field, such as may be populated by the recipient 115 to provide a group name for the senders.

The recipient 115 may execute a local mail application to receive and process messages. The local mail application may identify message addresses and may modify the header by including additional data in the header relating to the sender group attribute or may actually modify the sender data in the header to be the sender group attribute. In other words, the existing sender data may be superseded by the sender group attribute.

When the recipient 115 sends a message 125 to one or more of the senders 110a, 110b, the message sent may optionally be grouped with the messages received. In one example, the recipient 115 may select to "reply" to an individual message in the grouped conversation, in which case the recipient would be the original sender of the individual message to which the reply is being made. As another example, the recipient 115 may select to reply to the sender group and a message may be sent to each of the senders 110a, 110b in the group. As another example, the recipient 115 may select to reply to the sender group and may be prompted to identify sender(s) 110a, 110b in the group to which the reply is to be sent. As another example, the recipient 115 may specify a type of message to be sent, which may be determinative of which recipient is to receive the message. More specifically, the recipient inbox may include email, text messages (e.g., SMS), multimedia messages (e.g., MMS), visual voicemail and so forth, and the senders of such messages may optionally be grouped together based on the sender address according to the address grouping rule, and further optionally based on a type of message sent.

In an inbox where multiple types of messages may be received, such as where email, text messages, voicemail and the like are received and provided for display as a single unified inbox, the user may be given an option of what type of message to send to the group, either as a new message or in reply to a received message. When the recipient 115 selects to reply to a message in the group via email, for example, and a single email address is included in the grouped message addresses, the reply may be automatically directed to the single email address. Similarly, if the recipient 115 selects to reply via text message and a single text messaging address is included in the grouped message addresses, the reply may be sent as a text message to the text message address (e.g., phone number).

Messages from the recipient 115 to a sender 110a or 110b may be organized in the grouped messages by time stamp. For example, a reply to an individual message in the group of messages may appear as the latest communication of the group, such as at a top or bottom of a list of messages in the group. As another example, a reply to an individual message in the group of messages may appear next to the message to which the reply is responsive, and may be arranged in chronological order either above or below the message. In this latter example, the reply may not be arranged chronologically relative to each of the other messages in the group, but may be arranged chronologically relative to the message(s) related to the reply.

The recipient 115 of messages 120, 130 may be provided with options upon receipt of one or more of the messages 120, 130 from a sender for creating an address grouping rule including the sender. For example, a drop-down box may be provided via a graphical user interface to enable the recipient 115 to quickly add the message address to an existing address grouping rule or to create a new address grouping rule which includes the message address and an option to identify additional message addresses.

The recipient 115 may define a regex rule or an address grouping rule that uses a regular expression patterns. A regular expression may represent a pattern and may be used to specify a set of strings for a particular purpose. One way to specify a set of strings is to list the elements or members of the set. However, there are often more concise ways to specify the desired set of strings. For example, a set containing the three strings "Handel", "Händel", and "Haendel" may be specified by the pattern "H(ä|ae?)ndel", which pattern matches each of the three strings. The following example constructions may be used to construct patterns or regular expressions:

Boolean "or"
    A vertical bar may be used to separate alternatives. For example, "gray|grey" may match "gray" or "grey".

Grouping
    Parentheses may be used to define the scope and precedence of the operators (among other uses). For example, "gray|grey" and "gr(a|e)y" may be equivalent patterns which each describe the set of "gray" or "grey".

Quantification
    A quantifier after a character or group in an expression may specify how often the preceding element (i.e., the character or group) is allowed to occur. The following are example quantifiers:
        ? The question mark may indicate there is zero or one of the preceding element. For example, "colou?r" matches both "color" and "colour".
        * The asterisk may indicate there is zero or more of the preceding element. Thus, for example, "ab*c" matches "ac", "abc", "abbc", "abbbc", and so forth.
        + The plus sign may indicate there is one or more of the preceding element. For example, "ab+c" matches "abc", "abbc", "abbbc", and so on, but excludes "ac".

These constructions are example constructions and are not intended to be limiting. Various other additional or different constructions may be used for various implementations or contexts. The constructions may be combined to form arbitrarily complex expressions. For example, "H(ae?|ä)ndel" and "H(a|ae|ä)ndel" are both valid patterns which match the same strings as the earlier example of "H(ä|ae?)ndel".

The regular expressions may permit "wild cards", or characters representative of one or more characters that are not explicitly identified. For example, the "#" character may be used to represent any single numerical value. When combined with constructions such as "?", "*" or "+" as described previously, patterns may be created for capturing numerical strings.

Referring to FIG. 1B, a recipient inbox is illustrated showing messages from multiple senders. The recipient has received four separate messages from "Social Network" from four different message addresses. The messages may include multiple types of messages, such as text messages, voice messages, email messages, instant messages and so forth. A regex pattern may be specified in an address grouping rule to identify each of the senders for grouping together. For example, the recipient may recognize that each of the message addresses includes a "2425-" prefix. An example regex pattern to capture the four different message addresses may be "2425-252|2425-135|2425-2|2425-9271". However, a simpler pattern that may include each of the four message addresses and also capture future messages from different variations of the "2425-" message address may be "2425-#+" to indicate that at least one number follows the hyphen, but any number of numbers may also be included after the hyphen. Any messages received from message addresses matching the "2425-#+" regex pattern may be grouped together into a group defined by the recipient 115.

Referring to FIG. 1C, the four messages in FIG. 1B from "Social Network" have been grouped together in a "Social Network" group. As a result, the recipient inbox is cleaner and provides increased visibility and accessibility to messages from senders other than "Social Network". Meanwhile, the messages from "Social Network" may be conveniently grouped together for combined viewing.

Some senders, such as "Social Network" in the foregoing examples may send messages from multiple message addresses despite representing a single entity. For example, "Social Network" may use one message address for sending network status updates, another message address for sending private messages from other Social Network users, another message address for sending service updates for Social Network and so forth. While this configuration may be beneficial for statistical tracking, load distribution or other purposes for the Social Network, the recipient may simply desire to see messages from the multiple messages addresses as a single sender and/or for those messages to be grouped together. While this example includes multiple messages from a single entity using multiple addresses, the technology may also be applied to grouping messages from multiple entities using multiple addresses as well, such as groupings to group promotional messages together, to group messages from family members together, to group messages from particular friends together and so forth.

The sender(s) and recipient described in these examples may represent devices and/or operators controlling the devices. In other words, while the term "sender" is primarily used herein to describe a device associated with an entity desiring to send a communication, a "sender" may also refer to the entity, person or organization associated with the sender device or accessing the device or entity in sending the message to the recipient. Similarly, a recipient may refer to an end-user to which the communication is directed, or may also include or refer to an intermediary entity such as a domain, an email service and so forth. In some examples, a recipient device may be a mobile phone, a tablet computing device, a laptop, a desktop, and so forth. The sender device may be similar to the recipient device (e.g., a mobile device or non-mobile personal computing device) and/or may be a server or group of servers. The sender and recipient may communicate over a network, such as a local area network (LAN), wide area network (WAN), the Internet and so forth.

While this and other examples of the technology are primarily described in terms of email communications, including communications to or from email addresses, the technology may also be applied in the context of any other electronic communication. For example, instant messaging, texting, IRC (internet relay chat), video messages, as well as other technologies previously described and other messaging technologies not described may also utilize the technology described herein.

Figure 2:
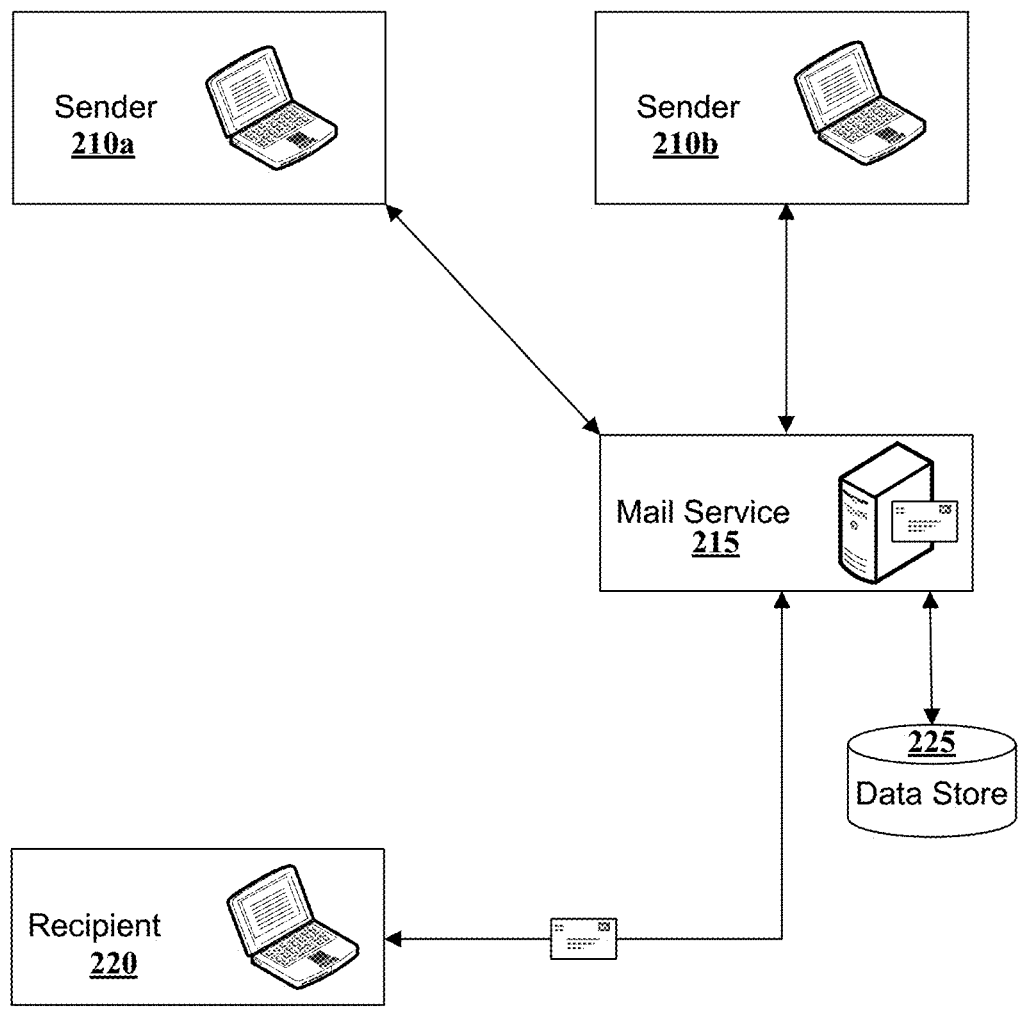
FIG. 2 is a schematic overview of a system for grouping messages from a plurality of senders implemented across a mail service in accordance with an example of the present technology.

Referring to FIG. 2, another system implementation is shown in accordance with an example of the present technology. The systems and methods in this and other figures may be implemented in any of a variety of configurations. The examples in the figures are for illustration purposes and are not intended to be limiting of potential configurations or implementations.

In FIG. 2, messages may be sent between a plurality of senders 210a, 210b and a recipient 220 via a mail service 215. In this example, the mail service 215 may manage a data store 225 for storing address grouping rules. In one implementation, the address grouping rules may be defined by the recipient 220 and submitted to the mail service 215 to be stored in the data store 225. The recipient 220 may access the mail service over a network connection and may be provided with a graphical user interface by which address grouping rules may be defined and messages may be managed. This example may be similar to the example described previously with regards to FIG. 1A, with a difference being the location of the data store 225 with the mail service as opposed to the recipient 220.

In an alternative implementation, the address grouping rules stored in the data store 225 may be defined by the mail service 215. For example, the mail service 225 may recognize that social networks, advertisers, etc., may use multiple different message addresses that are similar and may readily be captured using regex patterns. The mail service 215 may predefine address grouping rules to group senders 210*a*, 210*b* together. The mail service 215 may apply the address grouping rules to each subscriber (e.g., recipient 220) of the mail service 215 automatically or may allow each subscriber to fully or partially opt in or out of application of the address grouping rules. For example, the mail service 215 may request that the recipient 220 confirm permission for the mail service 215 to group senders based on the predefined address grouping rules. As another example, the mail service 215 may provide a list of available rules to the recipient 220 with an option to selectively apply or disable individual address grouping rules with respect to the recipient's messages.

In this or other examples of the present disclosure, rules may be defined by users and/or may be defined by machine. For example, the mail service 215 may be configured to automatically identify patterns among message addresses and to create a address grouping rule for grouping message addresses together when a number of the message addresses satisfy defined pattern constraints or are sufficiently similar. While rule creation may be operated based on rigidly defined pattern constraints, rule creation may also be performed using machine learning for optimization. For example, machine learning may utilize a set of user-approved address grouping rules as a basis for learning patterns and may begin to create new address grouping rules based on learned patterns for new incoming message addresses. For example, a user may define a number of address grouping rules for grouping message addresses. The mail service 215 may perform a machine learning operation using the address grouping rules to identify patterns and may begin analyzing existing and/or incoming messages to determine if additional message address groups may be created. When a new pattern is identified, the mail service 215 may propose a new address grouping rule to the recipient 220, after which the recipient 220 may confirm or reject the new address grouping rule. The recipient's response to the new address grouping rule may be used as feedback into the machine learning operation in shaping future identification of patterns or suggestions of address grouping rules. Machine learning may be performed on an individual recipient basis, such that address grouping rules may be proposed based on a particular user's preferences, history, mailbox, etc. In addition, machine learning may be performed across multiple subscribers' mailboxes such that patterns may be identified from a broader context for potentially more accurate and efficient pattern recognition and address grouping rule.

Machine learning may be an effective tool for use in optimizing pattern recognition and rule generation. Machine learning may take empirical data as input, such as data from the subscriber mailboxes, user-defined address grouping rules (e.g., training rules), user preferences, and so forth and may yield patterns or new address grouping rules (e.g., predictions) which may be representative of the underlying mechanism, user thought or interaction process that resulted in the generation of the data. Machine learning systems may take advantage of data to capture characteristics of interest having an unknown underlying probability distribution. Machine learning may be used to identify possible relations between observed variables, such as aspects of user interaction with respect to message address patterns and even message content types. Machine learning may also be used to recognize complex patterns and make machine decisions based on input data. In some examples, machine learning systems may generalize from the available data to produce a useful output, such as when the amount of available data is too large to be used efficiently or practically.

Machine learning for message grouping may be performed using a wide variety of methods of combinations of methods, such as supervised learning, unsupervised learning, temporal difference learning, reinforcement learning and so forth. Some non-limiting examples of supervised learning which may be used with the present technology include AODE (averaged one-dependence estimators), artificial neural network, back propagation, Bayesian statistics, naive bayes classifier, Bayesian network, Bayesian knowledge base, case-based reasoning, decision trees, inductive logic programming, Gaussian process regression, gene expression programming, group method of data handling (GMDH), learning automata, learning vector quantization, minimum message length (decision trees, decision graphs, etc.), lazy learning, instance-based learning, nearest neighbor algorithm, analogical modeling, probably approximately correct (PAC) learning, ripple down rules, a knowledge acquisition methodology, symbolic machine learning algorithms, subsymbolic machine learning algorithms, support vector machines, random forests, ensembles of classifiers, bootstrap aggregating (bagging), boosting (meta-algorithm), ordinal classification, regression analysis, information fuzzy networks (IFN), statistical classification, linear classifiers, fisher's linear discriminant, logistic regression, perceptron, support vector machines, quadratic classifiers, k-nearest neighbor, hidden Markov models and boosting. Some non-limiting examples of unsupervised learning which may be used with the present technology include artificial neural network, data clustering, expectation-maximization, self-organizing map, radial basis function network, vector quantization, generative topographic map, information bottleneck method, IBSEAD (distributed autonomous entity systems based interaction), association rule learning, apriori algorithm, eclat algorithm, FP-growth algorithm, hierarchical clustering, single-linkage clustering, conceptual clustering, partitional clustering, k-means algorithm, fuzzy clustering, and reinforcement learning. Some non-limiting example of temporal difference learning may include Q-learning and learning automata. Another example of machine learning includes data pre-processing. Specific details regarding any of the examples of supervised, unsupervised, temporal difference or other machine learning described in this paragraph that are generally known are also considered to be within the scope of this disclosure.

The mail service 215 may be configured to send and receive mail using any suitable protocol. Some example mail protocols include, but are not limited to, Internet Message Access Protocol (IMAP), Simple Mail Transfer Protocol (SMTP), Post Office Protocol (POP or POP3), Messaging Application Programming Interface (MAPI), Remote Procedure Call (RPC), Hyper Text Transfer Protocol (HTTP) and so forth.

Figure 3:
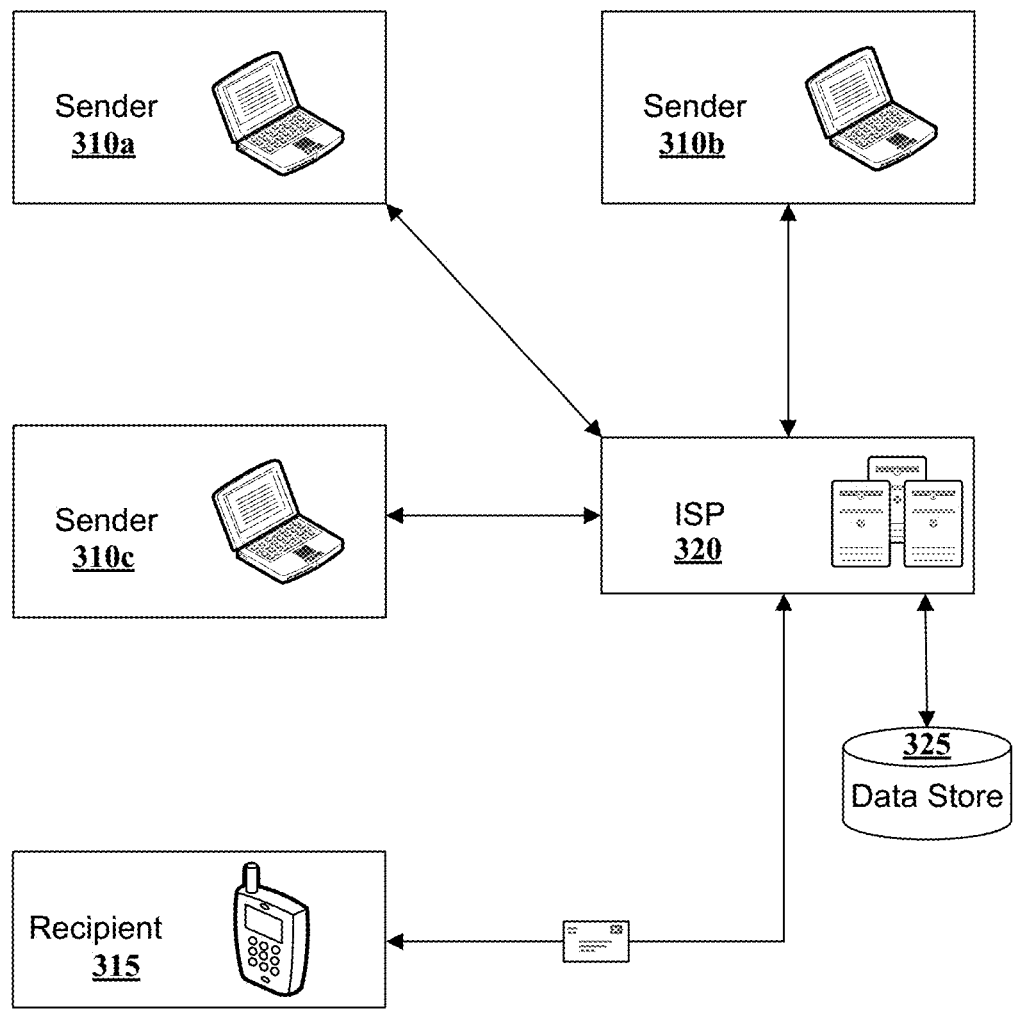
FIG. 3 is a schematic overview of a system for grouping messages from a plurality of senders implemented by an ISP in accordance with an example of the present technology.

Referring to FIG. 3, another example implementation of the present technology is illustrated where a recipient 315 may receive a plurality of messages from a plurality of senders 310a-310c. In this example, the recipient 315 may receive the messages via an Internet Service Provider (ISP) 320, which may provide internet, data, voice or other telecommunications services. In one example, the ISP 320 may be a cellular network operator for providing mobile phone services to the recipient 315. Text messages, multimedia messages and so forth may be transmitted wirelessly to a recipient 315 using any of the various known cellular communication technologies. Particularly for messages sent using the voice or data services of the ISP 320, messages may pass through ISP 320 servers before being delivered to the recipient 315. The ISP 320 may thus be in a position to apply address grouping rules to the messages before delivering the messages to the recipient 315. For example, the ISP 320 may maintain address grouping rules in a data store 325. Messages to be delivered to the recipient 315 may be modified by the ISP 320 to include the sender group attribute before being transmitted to the recipient 315. As with the mail service example described with regards to FIG. 2, the ISP 320 may optionally allow recipients to opt in or out of address grouping rule application.

In one example, the ISP 320 or other intermediary party, such as the email service described in FIG. 2, may filter messages for spam, phishing and other undesirable traits before delivering messages to the recipient 315. While a large amount of spam and other messages may be discarded by the ISP 320 upon receipt, whether some messages are spam may not be immediately apparent and the ISP 320 may desire to review these messages before transmitting the messages to the recipient 315. For example, the present technology may be used to group questionable message addresses into an address group for review or other processing, such as on a periodic review basis where message addresses of questionable messages received within a defined period of time are grouped together. If one or more of the message addresses is determined to be trusted, the sender group attribute may be removed from the messages associated with the trusted message addresses before sending the messages to the recipient 315. Additionally, although the original sender group attribute may have been removed, a secondary sender group attribute may optionally be applied to the messages before sending to the recipient, if the message addresses match any of the available address grouping rules.

Figure 4:
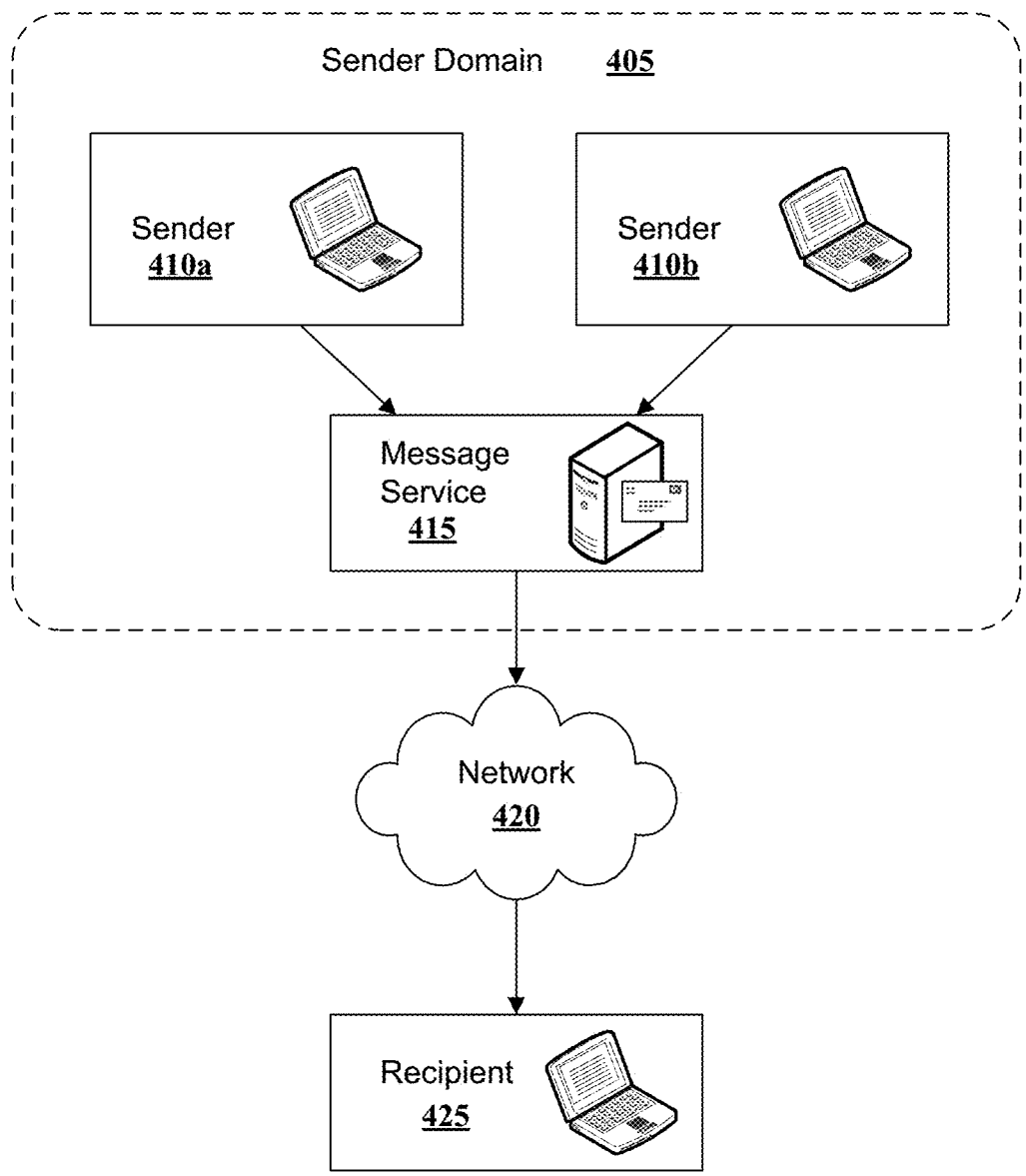
FIG. 4 is a schematic overview of a system for grouping messages from a plurality of senders belonging to a common domain in accordance with an example of the present technology.

Referring to FIG. 4, another example implementation of the present technology is illustrated where a plurality of senders 410a, 410b send messages to a recipient 425 over a network 420. In this example, the senders 410a, 410b may represent a single entity and may belong to a sender domain 405. The senders 410a, 410b may be used for different purposes, such as to convey messages from different portions of an organization, to send messages of different types and so forth. In one example, the sender domain 405 may represent a corporate domain for a corporation and the senders 410a, 410b may represent different employees (or employee workstations or accounts) at the corporation. As with previous examples, messages sent to the recipient 425 may be modified to include a common sender group attribute such that the messages are grouped together for viewing by the recipient 425. In this example, the sender domain 405 may perform the message modification for messages leaving the sender domain 405 using a message service 415. While not shown in this figure, the message service 415 may utilize address grouping rules stored in a data store, as has been described with other examples.

As mentioned previously, messages may be modified to include a sender group attribute in the message header indicating that the messages belong to an identified group. The modification may be in the form of the addition of a new attribute to existing data in the message, such as in the message header, message footer, or any other suitable location in the message. In this example, the recipient 420 may utilize a message application configured to understand the sender group attribute and how to process the sender group attribute. In the absence of such a configuration at the recipient 420, the sender group attribute may be ignored and messages may be displayed as if the messages had not been modified. In another example where the recipient 420 utilizes a remote mail client, the remote mail client may be configured to arrange the messages based on the sender group attribute.

The modification may alternatively be in the form of a replacement of an existing message address with a modified message address, where the modified message address is the sender group attribute with which the messages are modified. Where the message address is modified, devices, services and the like may properly display the grouped messages, at least as having come from a common sender even if not in a threaded format, without additional configuration at the recipient 425 or any intermediary device or service. The messages may optionally be further modified to reference one or more other messages also assigned to the sender group, such as by referencing a subject line, a message identification or other message aspect such that traditional threading rules may apply for threading the messages together. When the message address is modified and a user wishes to reply to the message, the message may either be sent to the sender group or may have the address resolved before the message is sent. In other words, although the message address may have been modified, the message may yet contain other information identifying the message or the sender which may be correlated to the pre-modified message sender address for use in sending the reply.

Referring to FIG. 5, a graphical user interface 510 for creating a address grouping rule is illustrated in accordance with an example of the present technology. The graphical user interface 510 may present a variety of options to the user for account and rule management in addition to options for address grouping rule creation. The user may be able to input an address grouping rule name 515 to name the address grouping rule and/or a group sender name. The user may be able to input address grouping rule variables 520, such as a regex pattern or group of patterns for use in identifying messages to be grouped. Another option 525 may be to allow the user to apply the address grouping rule being created to existing messages.

When a user selects the option 525 to apply the address grouping rule to existing messages, the retroactive application of the address grouping rule may result in a modification of metadata affecting how messages are to be displayed. In an example where messages are stored, managed, and/or made available for access or display from a mail service, ISP or the like, the mail service or ISP may modify the metadata such that when the mailbox is refreshed or otherwise viewed after application of the address grouping rule, the messages to which the address grouping rule applies may be displayed as grouped according to the rule. Where the messages are managed at a local client, the messages may be modified locally. Where a client device stores or otherwise retains messages received via a mail service or ISP and the address grouping rule is applied at the mail service or ISP, modification of the messages on the local client may be handled intelligently such that messages to be grouped may be identified for modification by the mail service or ISP and an instruction to modify the identified messages may be sent from the mail service or ISP to the local client without resending the messages themselves.

Once a user has input the desired address grouping rule information, the address grouping rule may be submitted or stored for use. The use of the address grouping rule may be immediate in the case of retroactive application of the address grouping rule, or the use may be in a period subsequent to creation of the address grouping rule when a message matching the address grouping rule is received. The address grouping rule may by applicable to even a single message matching the address grouping rule or to multiple messages from a same message address matching the address grouping rule. However, once additional messages from other message addresses also matching the address grouping rule are received, these additional messages may then be grouped with the message or messages from the single previous message address.

Figure 6:
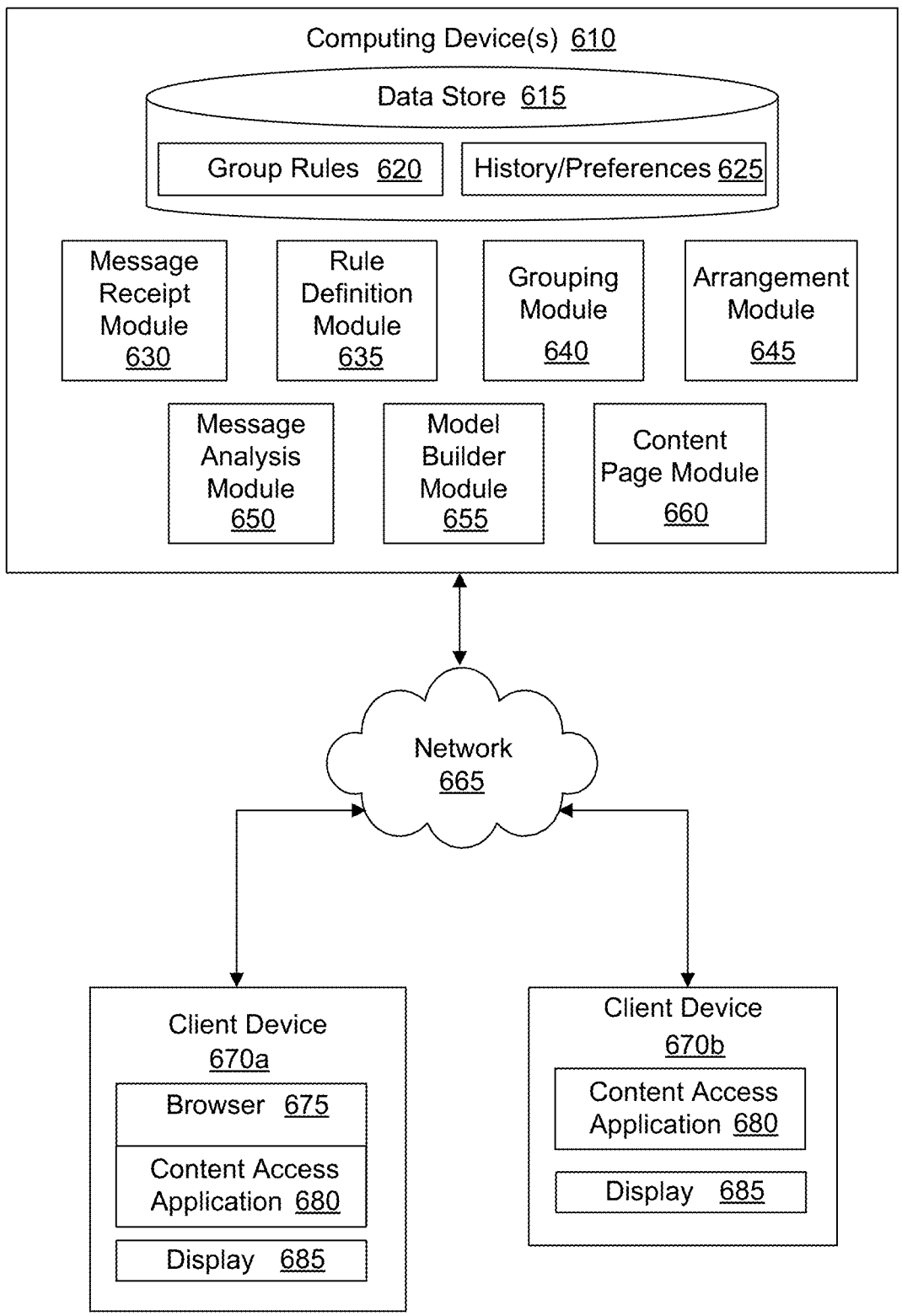
FIG. 6 is a system for managing message grouping for grouping messages from a plurality of senders and for learning a grouping model in accordance with an example of the present technology.

Referring now to FIG. 6, a block diagram of a system for grouping messages from message senders is illustrated in accordance with an example of the present technology. The system may be implemented on one or more computing devices 610, such as a mail server or ISP for example, and/or client devices 670a-670b and may be implemented using a network 665. The system may include a data store 615 and a number of modules 630, 635, 640, 645, 650, 655, 660 for storing and processing message and address grouping rule data, respectively.

The data store 615 may include, for example, a address grouping rules data store 620. The address grouping rules data store 620 may include rules defined by users, rules defined by administrators, example rules for use as training rules in creating rules, machine-defined address grouping rules, machine-learned rules and/or any other type of rule or rule source which may be used in grouping messages from message senders. The data in the address grouping rules data store 620 may be structured for suitable display on a client device's 670a, 670b display 685 via a browser 675 and/or content access application 680, such as in the form of a webpage or website with a graphical user interface for interacting with, modifying, creating or deleting address grouping rules.

The data store 615 may also include a history/preferences data store 625. The history/preferences data store 625 may include a history of the application of the address grouping rules in the address grouping rules data store 620, a history of the existence of address grouping rules (including additions, modifications, etc. of the address grouping rules), user profile data such as demographic information of the user (e.g., location, age, gender, etc.), user preferences, message inbox data, message data and so forth.

The term "data store" may refer to any device or combination of devices capable of storing, accessing, organizing, and/or retrieving data, which may include any combination and number of data servers, relational databases, object oriented databases, simple web storage systems, cloud storage systems, data storage devices, data warehouses, flat files, and data storage configuration in any centralized, distributed, or clustered environment. The storage system components of the data store may include storage systems such as a SAN (Storage Area Network), cloud storage network, volatile or non-volatile RAM, optical media, or hard-drive type media.

The system may include a message receipt module 630. The message receipt module 630 may receive messages with message addresses from senders. The message receipt module 630 may identify the message addresses from the header of the messages.

The system may include an address grouping rule definition module, or simply rule definition module 635. The rule definition module 635 may be used to add, delete and modify rules in the address grouping rules data store 620 as input is provided by a user through a user interface accessed through a content page module 660. The rule definition module 635 may further be operable to define rules using machine learning or other methods as described previously. In one example, the rule definition module 635 may convert natural language rule expressions into regex patterns when the address grouping rules input by a user are not in a regex pattern format. While many of the examples described herein relate to the use of regex patterns within the address grouping rules, any of a variety of other types of rules for identifying message addresses to group together may be used (e.g., language expressions, scripting, deductive logic expressions, statistical regression, Boolean expressions, etc.).

The system may include a grouping module 640. The grouping module 640 may be operable to group messages received using the message receipt module 630 and identified as belonging to a group according to address grouping rules stored in the address grouping rules data store 620, and the address grouping rules may have been defined via the rule definition module 635. In particular, the grouping module 640 may be operable to group messages together by modifying the messages to include a common sender group attribute within headers of the messages.

The system may include an arrangement module 645. The arrangement module 645 may be used to arrange messages modified by the grouping module 640 such that the messages are displayed properly to a user. For example, the arrangement module may arrange grouped messages chronologically, or may arrange the messages within the group by sender address or by any other suitable characteristic of the messages. Arrangement of the messages may result in grouped messages being displayed as a group, such as when a user selects a message group line item from an email client, where the grouped messages may be displayed in a list format with older messages in the group at one end of the list and newer messages in the group at another end of the list.

The system may include a message analysis module 650. The message analysis module 650 may be used to analyze message data to identify characteristics of the messages, such as may be used in a machine learning process. The message analysis module may perform machine learning operations on the messages and on user interactions with the messages and message groups to optimize message grouping or address grouping rules.

The system may include a model builder module 655. The model builder module 655 may use output from the message analysis module 650 to create a model for use by the rule definition module 635 in creating address grouping rules or for determining whether or how to recommend address grouping rules to users or to apply address grouping rules to messages. The learned model may be stored in the data store 615, such as in the history/preferences data store 625 for example. When the learned model performs at a desired performance level, such as accurately predicting message address grouping rules to apply, where accuracy may be determined according to conventional A/B testing, for example, the model may be deployed using the model builder module 655 across a larger set of users.

The model builder module 655 may be configured to personalize the model to particular user interests, such as based on the data included in the history/preferences data store 625. In other words, the model builder module 655 may personalize the model based on a user profile, message inbox preferences and so forth.

The system may include the content page module 660, as mentioned previously, for displaying content pages, including messages, a message inbox, a message sent box, a deleted item box, address grouping rules, address grouping rule interfaces and any other suitable objects or data for facilitating or enhancing user interaction with the system or for providing the message address grouping service to the user. The content page module 660 may be used with the message receipt module 630 and/or the arrangement module 645 to provide messages for display to users on a client device 670a, 670b upon receipt of the messages.

In one aspect, the content page module 660 may enable user feedback on the address grouping rules, particularly when the address grouping rules are not defined by the users at the client devices, but rather may be defined by an administrator at a sender, ISP, mail service or the like, or as may be defined by machine learning or and similar methods. For example, the user may be enabled to rate individual message address groupings from within a message inbox or in a detailed view of a message. The rating may be a quantitative rating, such as a rating out of five stars, or the rating may be qualitative, such as to indicate whether the grouping is relevant, useful, helpful, etc. The rating may also be a comment or other textual feedback. Use of user feedback with respect to the comparisons may serve multiple purposes. The user feedback may assist in identifying personal preferences of an individual user such that future message address groupings to be applied or suggested for messages sent to the user may be tailored to the specific user. In addition, the user feedback may assist in identifying generally how a segment of users responds to the message groupings and may be used to modify the groupings for a particular segment of users. As the effectiveness of message address grouping is determined through user feedback or through tracking of user interaction with the messages after display of grouped messages and so forth, the methods and models of providing the address grouping rules or message groupings may also be modified such that better address grouping rules are created and/or the display of message groups may be modified or tailored for individuals or defined customer segments. In other words, user feedback generally and user feedback tied to customer segments may provide another input to shape the model for future message grouping.

Client devices 670a-670b may access data, content pages, messages and so forth via the computing device 610 over a network 665. Example client devices 670a-670b may include, but are not limited to, a desktop computer, a laptop, a tablet, a mobile device, a television, a cell phone, a smart phone, a hand held messaging device, a set-top box, a gaming console, a personal data assistant, an electronic book reader, heads up display (HUD) glasses, a car navigation system, or any device with a display 685 that may receive and present the message content.

Users may be identified when accessing the message content via various methods, such as a unique login and password, a unique authentication method, an Internet Protocol (IP) address of the user's computer, an HTTP (Hyper Text Transfer Protocol) cookie, a GPS (Global Positioning System) coordinate, or using similar identification methods. A user may have an account with the server, service or provider, which may optionally track user preferences, profile information and so forth.

The system may be implemented across one or more computing device(s) 610, 670a, 670b connected via a network 665. For example, a computing device 610 may include a data store 615 and various engines and/or modules such as those described above and such modules may be executable by a processor of the computing device 610.

The modules that have been described may be stored on, accessed by, accessed through, or executed by a computing device 610. The computing device 610 may comprise, for example, a server computer or any other system providing computing capability. Alternatively, a plurality of computing devices may be employed that are arranged, for example, in one or more server banks, blade servers or other arrangements. For example, a plurality of computing devices together may comprise a clustered computing resource, a grid computing resource, and/or any other distributed computing arrangement. Such computing devices may be located in a single installation or may be distributed among many different geographical locations. For purposes of convenience, the computing device 610 is referred to herein in the singular form. Even though the computing device 610 is referred to in the singular form, however, it is understood that a plurality of computing devices may be employed in the various arrangements described above.

Various applications and/or other functionality may be executed in the computing device 610 according to various embodiments, which applications and/or functionality may be represented at least in part by the modules that have been described. Also, various data may be stored in a data store 615 that is accessible to the computing device 610. The data store 615 may be representative of a plurality of data stores as may be appreciated. The data stored in the data store 615, for example, may be associated with the operation of the various applications and/or functional entities described. The components executed on the computing device 610 may include the modules described, as well as various other applications, services, processes, systems, engines or functionality not discussed in detail herein.

The client devices 670a, 670b shown in FIG. 6 are representative of a plurality of client devices that may be coupled to the network. The client devices may communicate with the computing device over any appropriate network, including an intranet, the Internet, a cellular network, a local area network (LAN), a wide area network (WAN), a wireless data network or a similar network or combination of networks.

Each client device 670a, 670b may include a respective display 685. The display 685 may comprise, for example, one or more devices such as cathode ray tubes (CRTs), liquid crystal display (LCD) screens, gas plasma based flat panel displays, LCD projectors, or other types of display devices, etc.

Each client device 670a, 670b may be configured to execute various applications such as a browser 675, a respective page or content access application 680 for an online retail store and/or other applications. The browser 675 may be executed in a client device 670a, 670b, for example, to access and render content pages, such as web pages or other network content served up by the computing device 610 and/or other servers. The content access application may be executed to obtain and render for display content features and messaging features from the server or computing device 610, or other services and/or local storage media.

In some embodiments, the content access application 680 may correspond to code that is executed in the browser 675 or plug-ins to the browser 675. In other embodiments, the content access application 680 may correspond to a stand-alone application, such as a mobile application. The client device 670a, 670b may be configured to execute applications beyond those mentioned above, such as, for example, mobile applications, email applications, instant message applications and/or other applications. Users at client devices 670a, 670b may access content features through content display devices or through content access applications 680 executed in the client devices 670a, 670b.

Although a specific structure may be described herein that defines server-side roles (e.g., of content delivery service) and client-side roles (e.g., of the content access application), it is understood that various functions may be performed at the server side or the client side.

Certain processing modules may be discussed in connection with this technology. In one example configuration, a module may be considered a service with one or more processes executing on a server or other computer hardware. Such services may be centrally hosted functionality or a service application that may receive requests and provide output to other services or customer devices. For example, modules providing services may be considered on-demand computing that is hosted in a server, cloud, grid or cluster computing system. An application program interface (API) may be provided for each module to enable a second module to send requests to and receive output from the first module. Such APIs may also allow third parties to interface with the module and make requests and receive output from the modules. Third parties may either access the modules using authentication credentials that provide on-going access to the module or the third party access may be based on a per transaction access where the third party pays for specific transactions that are provided and consumed.

Figure 7:
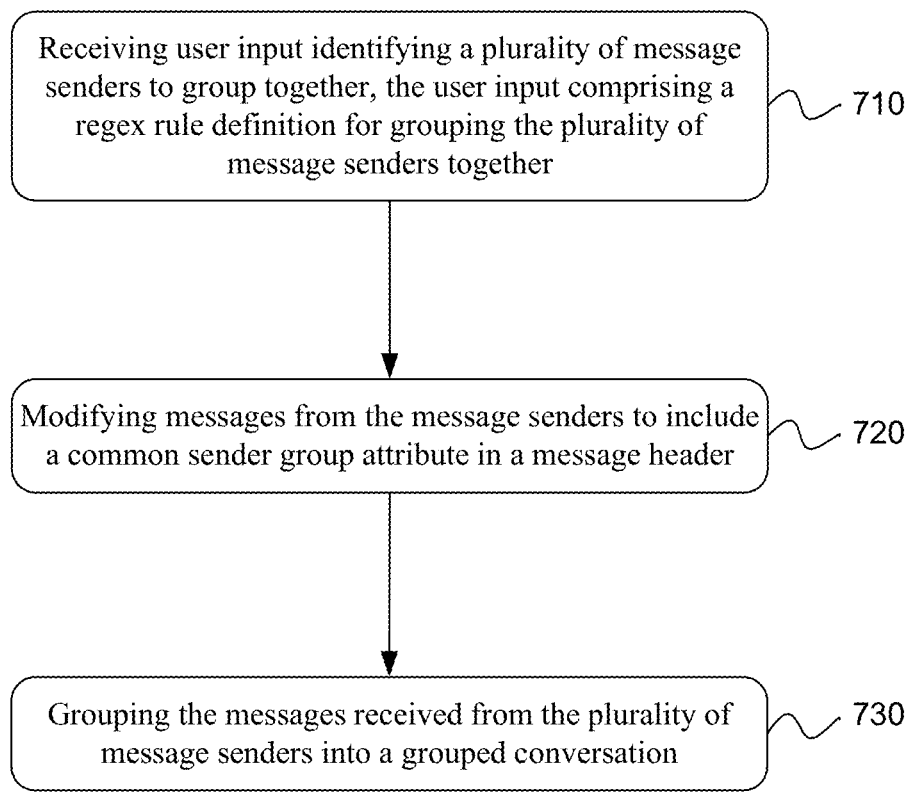
FIGS. 7-8 are a method for message grouping in accordance with examples of the present technology.

Referring now to FIG. 7, a flow diagram of a method is illustrated for user-defined grouping of messages in accordance with an example of the present technology. The method may include receiving 710 user input identifying message senders to group together. The user input may, for example, be in the form of a regex pattern. The method may include modifying 720 messages from the message senders to include a common sender group attribute in a message header. The modification of the message may include a modification by changing some of the data existing in the message header or a modification by adding data to the data existing in the message header.

The method may further include modifying messages to the plurality of message senders to include the common group header. In other words, when a user responds or sends a message to any of the message senders, even if not in response to a message from the sender(s), messages to the senders may similarly be modified to include the common sender group attribute. The method may include combining or grouping 730 the messages received from or exchanged with the message senders as a grouped conversation. The combination of the messages may be in the form of displaying the messages together as a group, for example, after the messages are received.

In some examples, the message senders may include a plurality of message addresses originating from a single entity, such as a social network, for example. In other examples, the messages senders may include multiple different entities which may or may not be related to one another. The messages from these entities also may or may not be related to one another.

Figure 8:
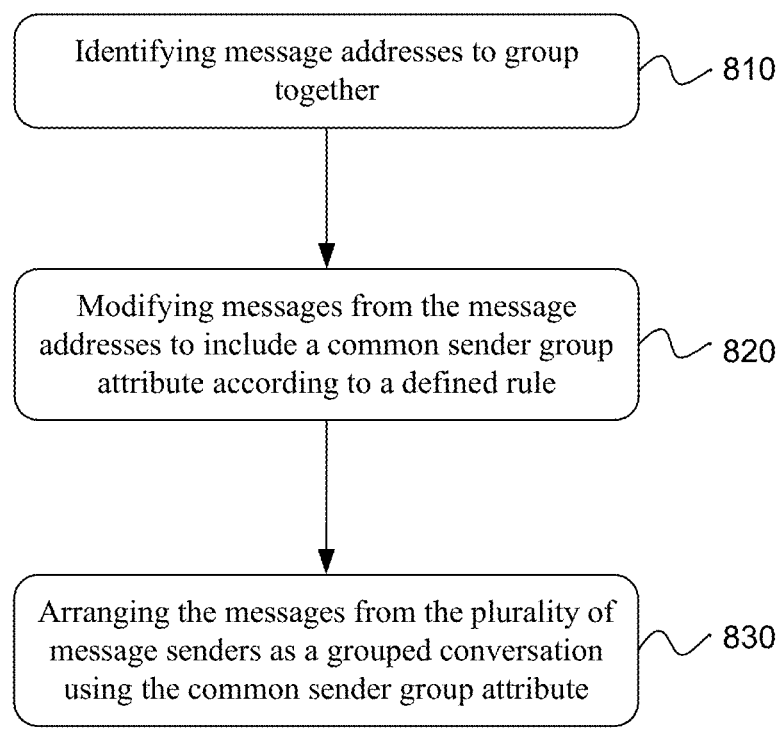

Referring now to FIG. 8, a flow diagram of a method for managing messages is illustrated in accordance with an example of the present technology. The method may include identifying 810 message addresses to group together and modifying 820 the messages from the message addresses to include a common sender group attribute according to a defined address grouping rule. The method may further include arranging 830 the messages from message senders as a grouped conversation using the common sender group attribute.

In one example, the method may include modifying the messages at a client device, as described with regards to FIG. 1. In another example, the method may include modifying the messages at a mail server, as described with regards to FIG. 2. In another example, the method may include modifying the messages at an ISP, as described with regards to FIG. 3. In yet another example, the method may include modifying the messages at a sender, as described with regards to FIG. 4.

In one aspect, the messages may be from different message addresses and may include different subject lines. Additionally, the messages may be received at different times from one another. In other words, the messages may be dissimilar in many regards but may be grouped together due to a address grouping rule defining the grouping of these messages together. In a more specific example, while the message addresses may be different, the messages addresses may include a common or shared portion that is common or shared among each of the message addresses included in the group, and the address grouping rule may identify the message addresses by identifying the common portion of the message addresses. The defined address grouping rule may optionally include a wildcard representing a portion of the message addresses other than the common portion in order to capture the various message addresses despite differences in the addresses. The wildcard may be limited in some fashion to reduce a number of message addresses to include in the group. For example, as has been described previously, regex operators may be used which limit the number of occurences of characters in a sequence to 0 or 1.

In one example of the method, the method may include grouping messages from the sender where a subset of the messages includes threaded messages threaded by subject, message identifications or other message attributes. In one aspect, the sender group attribute for an individual of the messages may reference at least one other of the messages in order to create a pseudo-threading based on the sender group attribute. The method may also include filtering the grouped messages into a folder using a user-defined filtering rule. For example, the user may define filtering rules for filtering various message groups grouped by sender using the address grouping rules into a folder for organization.

The method may include displaying the messages together as a group when selected by a user, such as by displaying contents of the messages in a list format one after another. In another example, the method may include displaying the messages as a single message, or rather as a single line item in a message inbox, which when selected may display the messages in the list format mentioned previously.

In some examples, this or other methods described herein may be implemented wholly or partially as computer readable program code executed by a processor and the computer readable code may be embodied on a non-transitory computer usable medium.

Figure 9:
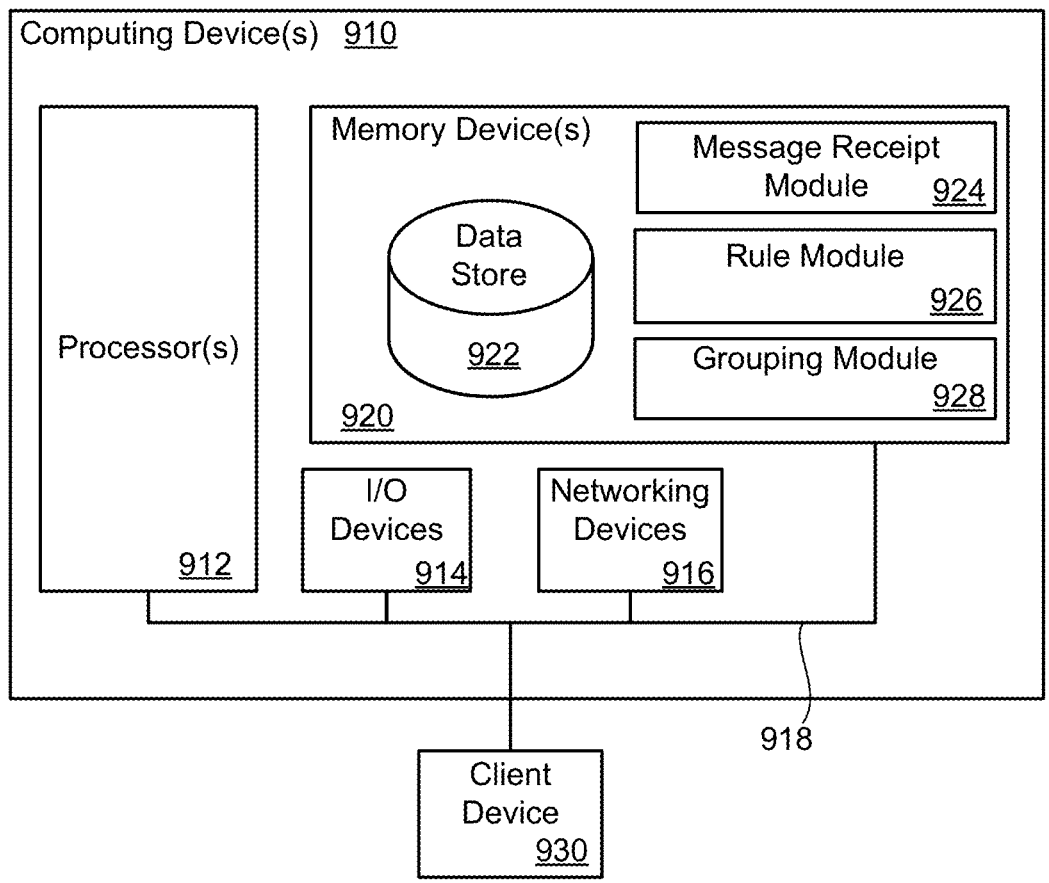
FIG. 9 is a block diagram of a computing system for grouping messages in accordance with an example of the present technology.

FIG. 9 illustrates a computing device 910 on which services or modules of this technology may execute. A computing device 910 is illustrated on which a high level example of the technology may be executed. The computing device 910 may include one or more processors 912 that are in communication with memory devices 920. The computing device 910 may include a local communication interface 918 for the components in the computing device. For example, the local communication interface 918 may be a local data bus and/or any related address or control busses as may be desired.

The memory device 920 may contain modules (i.e., message receipt module 924, rule module 926, grouping module 928) that are executable by the processor(s) and data for the modules. A data store 922 may also be located in the memory device 920 for storing data related to the modules and other applications along with an operating system that is executable by the processor(s) 912.

The computing device 910 may further include or be in communication with a client device 930, which may include a display device. The client device 930 may be available for an administrator to use in interfacing with the computing device 910, such as to review received messages, define address grouping rules, make improvements to machine learning models and so forth.

Various applications may be stored in the memory device 920 and may be executable by the processor(s) 912. Components or modules discussed in this description that may be implemented in the form of software using high programming level languages that are compiled, interpreted or executed using a hybrid of the methods.

The computing device 910 may also have access to I/O (input/output) devices 914 that are usable by the computing devices. An example of an I/O device 914 is a display screen that is available to display output from the computing devices. Other known I/O device may be used with the computing device as desired. Networking devices 916 and similar communication devices may be included in the computing device 910. The networking devices 916 may be wired or wireless networking devices 916 that connect to the internet, a LAN, WAN, or other computing network.

The components or modules that are shown as being stored in the memory device 920 may be executed by the processor 912. The term "executable" may mean a program file that is in a form that may be executed by a processor 912. For example, a program in a higher level language may be compiled into machine code in a format that may be loaded into a random access portion of the memory device 920 and executed by the processor 912, or source code may be loaded by another executable program and interpreted to generate instructions in a random access portion of the memory to be executed by a processor 912. The executable program may be stored in any portion or component of the memory device 920. For example, the memory device 920 may be random access memory (RAM), read only memory (ROM), flash memory, a solid state drive, memory card, a hard drive, optical disk, floppy disk, magnetic tape, or any other memory components.

The processor 912 may represent multiple processors and the memory 920 may represent multiple memory units that operate in parallel to the processing circuits. This may provide parallel processing channels for the processes and data in the system. The local interface may be used as a network to facilitate communication between any of the multiple processors and multiple memories. The local interface may use additional systems designed for coordinating communication such as load balancing, bulk data transfer, and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. The modules may be passive or active, including agents operable to perform desired functions.

The technology described here may also be stored on a computer readable storage medium that includes volatile and non-volatile, removable and non-removable media implemented with any technology for the storage of information such as computer readable instructions, data structures, program modules, or other data. Computer readable storage media include, but is not limited to, RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which may be used to store the desired information and described technology. As used herein, the terms "medium" and "media" may be interchangeable with no intended distinction of singular or plural application unless otherwise explicitly stated. Thus, the terms "medium" and "media" may each connote singular and plural application.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media. The term computer readable media as used herein includes communication media.

Reference was made to the examples illustrated in the drawings, and specific language was used herein to describe the same. It will nevertheless be understood that no limitation of the scope of the technology is thereby intended. Alterations and further modifications of the features illustrated herein, and additional applications of the examples as illustrated herein, which would occur to one skilled in the relevant art and having possession of this disclosure, are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. One skilled in the relevant art will recognize, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. A computer implemented method for user-defined grouping of messages comprising:
    identifying a plurality of message addresses to group together according to an address grouping rule, wherein the plurality of message addresses correspond to one or more entities from which the messages originated or to which the messages were sent;
    modifying, using the address grouping rule, the identified plurality of message addresses to group together, to include a common sender group attribute in the messages according to the address grouping rule matching the plurality of message addresses; and
    arranging the messages as a grouped conversation using the common sender group attribute.

2. The method of claim 1, further comprising:
    arranging the messages as the grouped conversation further based on a type of message sent for at least one of the messages.

3. The method of claim 1, further comprising:
    arranging the messages as the grouped conversation further based on a time stamp for at least one of the messages.

4. The method of claim 1, further comprising:
    receiving a user input selecting to reply to the common sender group attribute; and
    prompting a user to identify senders in the common sender group attribute to which the reply is to be sent.

5. The method of claim 1, further comprising:
    receiving a user input selecting to reply to the common sender group attribute; and
    prompting a user to identify a type of message to send to the common sender group attribute.

6. The method of claim 1, further comprising:
    receiving a user input that identifies the plurality of message addresses to group together.

7. The method of claim 6, wherein the user input defines the address grouping rule for identifying the messages.

8. The method of claim 6, wherein the address grouping rule specifies a portion of an address of the plurality of message addresses that is common to each of the messages to be grouped together.

9. The method of claim 6, wherein the user input defines the address grouping rule for modifying the messages.

10. A system comprising one or more computing nodes, each of which includes at least one processor and a memory, wherein the one or more computing nodes are configured to collectively implement:
    a message receipt module to receive messages and identify a plurality of message addresses from the messages, wherein the message addresses correspond to one or more entities from which the messages originated or to which the messages were sent;
    a rule data store to store one or more address grouping rules;
    an address grouping rule definition module to define, delete or modify the address grouping rules; and
    a grouping module to group messages together by modifying the messages in a data store using one of the address grouping rules to include a common group attribute based in part on the one of the address grouping rules matching the plurality of message addresses.

11. The system of claim 10, wherein at least one of the address grouping rules is user defined.

12. The system of claim 10, wherein at least one of the address grouping rules is machine defined.

13. The system of claim 12, further comprising:
    a message analysis module to identify characteristics of the messages for use in a machine learning process to define, delete or modify the address grouping rules.

14. The system of claim 10, further comprising:
    a content page module to display content pages, including messages, a message inbox, a message sent box, a deleted item box, address grouping rules, and an address grouping rule interface for user interaction with the computer nodes.

15. The system of claim 10, wherein the messages include a plurality of different message types.

16. The system of claim 10, wherein the address grouping rules include rule definitions selected from a group consisting of a regex rule type, a language expression type, a scripting type, a deductive logic expression type, a statistical regression type, and a Boolean expression type.

17. A non-transitory computer readable medium storing instructions, which when executed by one or more processors of one or more computer systems, cause the one or more processors to:
receive a plurality of messages;
identify, from the plurality of messages, a plurality of message addresses to group together using an address grouping rule matching a portion of the plurality of messages, wherein the plurality of message addresses correspond to one or more entities from which a message originated or to which the message was sent;
modifying the plurality of message addresses, identified to group together using the address grouping rule, to include a common sender group attribute in the messages associated with the address grouping rule; and
arranging the plurality of messages as a grouped conversation using the common sender group attribute.

18. The non-transitory computer readable medium of claim 17, wherein the instructions further cause the one or more processors to:
determine a plurality of different message types using the plurality of messages; and
arranging the messages as the grouped conversation using the common sender group attribute and the plurality of different message types.

19. The non-transitory computer readable medium of claim 17, wherein the instructions further cause the one or more processors to:
receive a rule definition selected from a group consisting of a regex rule type, a language expression type, a scripting type, a deductive logic expression type, a statistical regression type, and a Boolean expression type; and
define the address grouping rule using the rule definition.

20. The non-transitory computer readable medium of claim 17, wherein the instructions further cause the one or more processors to:
identify characteristics of the plurality of messages; and
modify the address grouping rule using the characteristics and a machine learning process.

* * * * *